United States Patent [19]

Gysegem

[11] 4,311,629
[45] Jan. 19, 1982

[54] METHOD FOR MAKING ANTIFOULING COATING COMPOSITION CONTAINING HYDROLYZED ORGANOTIN SILOXANE POLYMER

[75] Inventor: A. Peter Gysegem, Lebanon, Oreg.

[73] Assignee: Ameron, Inc., Monterey, Calif.

[21] Appl. No.: 206,295

[22] Filed: Nov. 12, 1980

[51] Int. Cl.³ .................. C09D 3/48; C09D 3/82; C08G 77/04; C08G 77/06
[52] U.S. Cl. .................. 260/33.6 SB; 106/1.17; 106/1.29; 106/14.39; 106/15.05; 424/184; 424/288; 528/26; 528/30
[58] Field of Search .................. 260/33.6 SB; 528/26, 528/30; 106/15.05, 14.39, 1.17, 1.29; 424/184, 288

[56] References Cited

U.S. PATENT DOCUMENTS

| | | | |
|---|---|---|---|
| 2,768,149 | 10/1956 | Millar | 260/33.6 |
| 2,877,202 | 3/1959 | Olson | 260/45.4 |
| 3,653,930 | 4/1972 | Law et al. | 106/1 |
| 4,080,190 | 3/1978 | Law et al. | 71/67 |
| 4,102,860 | 7/1978 | Wohlfarth et al. | 528/30 |
| 4,113,665 | 9/1978 | Law et al. | 260/37 SB |
| 4,187,211 | 2/1980 | Robinson et al. | 260/42.44 |
| 4,227,929 | 10/1980 | Law et al. | 106/1.29 |

OTHER PUBLICATIONS

Gysegem et al. "Synthesis & Characterization Organometallic Polymer System . . . " ACS ORG Coatings, vol. 39, Sep. 1978.
Derwent 55677/A(31) "Polymers . . . Used in Mfg. of Marine Antifouling Paints" (Jun. 24, 1978) J53071200 Japan Rubber Comp.
Derwent Abs. 90389B/50 "Antifouling Comp. . . . " Chugoku Toryo KK (Nov. 6, 1979) J54142241.

*Primary Examiner*—Herbert J. Lilling
*Attorney, Agent, or Firm*—Christie, Parker & Hale

[57] ABSTRACT

A solution containing hydrolyzed organotin siloxane polymeric material is formed by hydrolyzing an organotin R-oxy siloxane in a water miscible solvent; R being an alkyl or alkoxyalkyl group with less than six carbon atoms. A water immiscible solvent is added and the water miscible solvent and R-alcohol from hydrolysis are removed by distillation. A marine antifouling coating can be made when the water immiscible solvent evaporates from the solution. A preferred embodiment hydrolyzes tributyltin ethoxysiloxane in ethyl alcohol with xylene as the water immiscible solvent.

39 Claims, No Drawings

METHOD FOR MAKING ANTIFOULING COATING COMPOSITION CONTAINING HYDROLYZED ORGANOTIN SILOXANE POLYMER

FIELD OF THE INVENTION

This invention relates to making a solution containing hydrolyzed organotin siloxane polymeric material suitable for use in marine antifouling coatings.

BACKGROUND OF THE INVENTION

Compositions have been developed for protecting marine surfaces from fouling organisms, including a linear or cross-linked polymer having a siloxane backbone and trisubstituted tin radicals such as tributyl tin bonded to silicon atoms by way of an oxygen atom. The biologically active polymer can be used for forming coatings for steel, concrete, or other surfaces exposed to marine environments for inhibiting the growth of fouling organisms. In some embodiments the polymer is present as an additive in a coating composition. In other embodiments the cross-linked polymer forms a portion of the binder of the coating.

U.S. Pat. No. 4,080,190 by Law and Gysegem, which is hereby incorporated by reference, discloses such compositions with a variety of organotin radicals and synthesis techniques. The ratio of tin to silicon atoms in the polymer can be varied for obtaining different properties in the polymer. When the proportion of tin is low, a cross-linked polymer can be formed by hydrolysis and polycondensation of a siloxane-tin precursor. In an exemplary embodiment the precursor is formed by reaction of tetraethoxysilane or a short chain ethosyxiloxane with a carboxylic acid derivative containing a tin radical, such as tributyltin acetate. A prepolymer can be formed by partially or completely hydrolyzing the precursor. Water and a hydrolysis catalyst such as hydrogen ion or hydroxyl ion are added to the solvent. Upon evaporation of the solvent polycondensation occurs, yielding the desired polymer.

It is sometimes convenient to hydrolyze the precursor to a prepolymer before completing a coating composition since prehydrolysis can reduce the curing time of a coating. Polycondensation of the prepolymer has heretofore been inhibited by retaining the prepolymer in ethyl alcohol or similar solvent. Ethyl alcohol is a product of hydrolysis of the precursor when, for example, an ethoxysilicate is employed in the synthesis. When such a coating is applied, evaporation of ethyl alcohol results in polycondensation in the coating.

Ethyl alcohol and similar water miscible solvents may not be compatible with other ingredients in the coating composition. This is particularly true when the coating composition includes a chlorinated rubber, for example. It is therefore desirable to provide a solution containing polymeric material which is compatible with such coating compositions.

BRIEF SUMMARY OF THE INVENTION

Thus, in practice of this invention, a solution containing hydrolyzed organotin siloxane polymeric material is formed by combining an organotin R-oxy siloxane, where R represents a group consisting of alkyl and alkoxyalkyl radicals containing less than six carbon atoms, a water miscible solvent, water, a hydrolysis catalyst, and a water immiscible solvent. After hydrolysis of the organotin R-oxy siloxane, the water miscible solvent and R-alcohol from the hydrolysis reaction are removed by distillation. The water immiscible solvent, such as xylene, is preferably added after hydrolysis. Surprisingly, it is found that precipitation of such polymeric material does not occur from the water immiscible solvent.

DESCRIPTION

As used herein, the term "precursor" refers to an organotin R-oxy siloxane where R represents a group consisting of alkyl and alkoxyalkyl radicals containing less than six carbon atoms, the term "prepolymer" refers to a precursor that is partly or completely hydrolyzed but not completely condensed; the term "polymer solution" refers to a solution of a water immiscible solvent containing a polymeric material; and the term "polymer" refers to a thoroughly polycondensed prepolymer including linear and/or cross-linked polymers.

Precursors for forming prepolymers for marine antifouling compositions have the formula

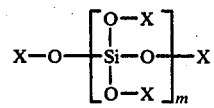

where m is from about 1 to about 10; where each X is independently selected from the group consisting of R and Y; where each Y in the precursor independently is a trisubstituted tin radical having the formula

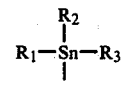

where $R_1$, $R_2$, and $R_3$ are independently selected from the group consisting of alkyl, cycloalkyl, and aryl radicals, where $R_1$, $R_2$, and $R_3$ contain in combination up to about 18 carbon atoms, and where the X's are selected so that the ratio of tin atoms to silicon atoms in the precursor is in the range of from about 1:50 to about 1:1. The Y's in the precursor can be the same or different. Depending upon the ratio of tin atoms to silicon atoms in the precursor and the nature of the $R_1$, $R_2$, and $R_3$ groups on the tin, the precursor can be a liquid or a waxy solid at room temperature.

In a mixture of precursor molecules, m represents the average number of silicon atoms per precursor molecule. Generally there is a random distribution of molecules comprising more and less than m silicon atoms. For example, where m equals 5, precursor molecules containing predominantly 4, 5 or 6 silicon atoms are present. A few molecules with larger and smaller numbers of silicon atoms can also be present.

In the above formula for the precursors, preferably m is less than about 10 so the precursor can be polymerized by hydrolysis and polycondensation. Preferably m is an average of about five. Such a material comprises a mobile liquid with a high $SiO_2$ content having ample side groups for substitution of tin radicals and subsequent hydrolysis and polycondensation. A suitable material is available from Union Carbide Chemical Company as "Ethyl Silicate 40". This is an ethyl polysilicate or ethoxysiloxane having an average of about five silicon atoms per molecule, that is, m equals five, although individual molecules may comprise as few as one silicon atom. This material has an SiO₂ content of about 40%.

R comprises alkyl and alkoxyalkyl radicals containing less than about 6 carbon atoms so that the alcohol analog of R formed during hydrolysis of the precursor has sufficient volatility for distillation. Generally, the higher the molecular weight of R, the lower the volatility of its alcohol analog. Exemplary of the radicals which R can be are methyl, ethyl, n-propyl, isopropyl, n-butyl, isobutyl, methyloxymethyl, methyloxyethyl, and the like. Preferably X is the ethyl radical since transesterification yields ethyl acetate in a preferred embodiment and hydrolysis yields ethyl alcohol, each of which is readily removed by distillation.

$R_1$, $R_2$, and $R_3$ can be lower alkyl radicals containing less than about 10 carbon atoms such as methyl, ethyl, propyl, isopropyl, n-butyl, sec-butyl, tert-butyl, amyl, hexyl, octyl, nonyl, isooctyl radicals, and the like. These can also be a substituted lower alkyl radical. Substituents include chloride, bromide, ether and aryl substituents, and the like.

$R_1$, $R_2$, and $R_3$ can be a lower cycloalkyl radical such as the cyclohexyl radical and substituted lower cycloalkyl radicals.

$R_1$, $R_2$, and $R_3$ can be an aryl radical such as the phenyl radical and substituted phenyl radicals. Substituents include chloride, bromide, ether, and alkyl substituents, and the like. Thus $R_1$, $R_2$, and $R_3$ can be chlorophenyl, bromophenyl, nitrophenyl, tolyl, xylyl, ethylphenyl, and the like. When $R_1$, $R_2$, and $R_3$ are all aryl radicals and the precursor has a tin to silicon atom ratio of about 1:5, the prepolymer is a solid with only slight solubility in common solvents. Thus, if the prepolymer is to be used for forming a binder for coating compositions, $R_1$, $R_2$, and $R_3$ generally cannot all be aryl radicals.

Preferably, $R_1$, $R_2$, and $R_3$ are the same because tri-substituted tin compounds where the tin is substituted with the same radical are commercially available. However, $R_1$, $R_2$, and $R_3$ can be different such as where Y is the octyl-dimethyl tin radical.

The total number of carbon atoms comprising a tri-substituted tin moiety has a large effect on its biological activity. The effect appears to be one of size rather than chemical or electronic effect. For example, the octyl-dimethyl and the tributyl tin radicals, which have about the same number of carbon atoms, exhibit about the same toxicity toward mammals and fouling organisms. In general, small moieties, such as the trimethyl tin and triethyl tin radicals, show only slight toxicity toward bacteria and marine fouling organisms, but extremely high toxicity toward mammals, including man. Tripropyl tin and tributyl tin, on the other hand, exhibit low toxicity toward man, but are the most effective trialkyl tin compounds for antifouling use. As the total number of carbons in a trialkyl tin compound increases above about 12 to 14, both the human toxicity and antifouling activity decrease due to the increase of the total number of carbon atoms.

Preferably, when $R_1$, $R_2$, and $R_3$ are alkyl radicals, the total number of carbon atoms in $R_1$, $R_2$, and $R_3$ in combination is less than about 14 carbon atoms for high biological activity. Generally, $R_1$, $R_2$, and $R_3$ contain less than about 18 carbon atoms in combination so that compositions effective in protecting materials from growth of marine organisms can be prepared.

Preferably, $R_1$, $R_2$, and $R_3$ are selected so that Y is the tributyl, tripropyl, triphenyl or tricyclohexyl tin radical. These radicals are preferred because they are broad-spectrum toxicants, expecially for many marine organisms, and display minimal toxicity to man. The tributyl tin radical is particularly preferred.

A precursor preferably has a ratio of tin to silicon atoms greater than about 1:50 because at ratios less than about 1:50 a coating prepared with the prepolymer shows inadequate biological activity to be of much commercial value. The maximum ratio of tin to silicon atoms in the precursor is preferably about 1:1. If the ratio is higher than about 1:1 steric hindrance by the tin moiety may inhibit extensive polycondensation and significantly limit the molecular weight of the resultant polymer.

The optimum tin to silicon atom ratio of a prepolymer used for forming a binder is a balance of competing considerations. On one hand, the higher the tin to silicon atom ratio, the more effective and more long-lived is a coating including the prepolymer. However, at higher ratios of tin to silicon atoms, curing of the prepolymer by hydrolysis and polycondensation to form a polysiloxane becomes progressively more difficult. At tin to silicon atom ratios greater than about 2:5, the prepolymer is not suitable for preparing binders for coating compositions because the polymer remains soft and does not cure to sufficient hardness to be used as a coating. It is believed that a prepolymer having a tin to silicon atom ratio greater than about 2:5 is unsatisfactory for forming binders because the bulky organotin group prevents polymerization by either blocking the attack of water or the reactive sites of the precursor, or by inhibiting condensation of the intermediate silanol formed during hydrolysis with another silanol group.

A prepolymer for forming a biologically active polysiloxane binder preferably has a tin to silicon atom ratio of from about 1:12 to about 1:3. In this range it has been found that a hard, clear, solvent-resistant film exhibiting effective and long-lived biological activity in preventing fouling on marine surfaces can be formed.

The precursor is preferably prepared by reacting a silicate having the formula

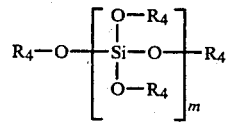

with about n moles per mole of the silicate of a carboxylic acid derivative having the formula

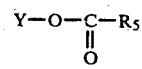

where m and Y are as above, and where the ratio of n to m is in the range of from about 1:50 to 1:1 to give a desired tin to silicon atom ratio as described above. $R_4$ represents the group consisting of alkyl and alkoxyalkyl radicals containing less than about six carbon atoms, i.e., $R_4$ is the organic portion of the group from which X is selected. Each $R_4$ may be the same or different. Preferably, $R_4$ is the ethyl radical.

$R_5$ is selected from the group consisting of hydrogen, and alkyl, cycloalkyl, and alkoxyalkyl radicals. $R_5$ is selected for convenience, i.e., so that the carboxylic acid ester formed in the reaction is sufficiently volatile to be removed easily from the product. Preferably a trisubstituted tin acetate is employed.

Exemplary of silicates and carboxylic acid derivatives which can be used are "Ethyl Silicate 40" and tributyltin acetate. "Ethyl Silicate 40" and tributyltin acetate react according to the equation

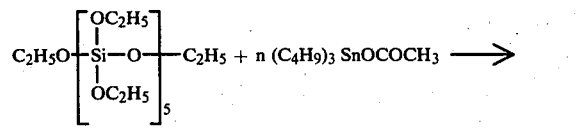

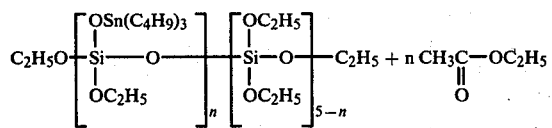

The tributyltin substituted silicon atoms are randomly located along the chain, and a single silicon atom can be substituted by none, one, two or three tributyltin groups.

The reaction of the silicate and the carboxylic acid derivative is conducted at an elevated temperature, and at least at a temperature sufficiently high that the carboxylic acid derivative melts. The silicate and carboxylic acid derivative are reacted at a temperature below the temperature at which the precursor prepared from the silicate and carboxylic acid derivative decomposes. Decomposition may be evidenced by darkening of the precursor and a hydrocarbon-like odor. For example, when preparing a precursor from tributyltin acetate and Ethyl Silicate 40, the temperature should be maintained from about 160° to about 180° C.

Another method for preparing the precursor is to combine a silicate, as described above, with about n/2 moles of water per mole of the silicate and n/2 moles per mole of the silicate of a bis-trisubstituted tin oxide having the formula Y—O—Y where Y and n have the same meaning as above. Generally, a silicate reacts at a lower temperature with a tin oxide than with the carboxylic acid derivative of the tin oxide. For example, bis-tributyltin oxide reacts at a fast rate with Ethyl Silicate 40 in the presence of water at about 85° C. compared to the 160° C. required when tributyltin acetate is used.

Another method for preparing the precursors is to combine a silicate as described above with about n moles of a trisubstituted tin hydroxide having the formula Y—OH, where Y and n have the same meaning above, per mole of the silicate. The silicate and tin hydroxide are combined at a temperature below the temperature at which the precursor formed from the tin hydroxide and the silicate decomposes.

The fully polymerized polysiloxane is prepared from the precursor by hydrolysis followed by polycondensation. The hydrolysis of alkylsilicates at neutral pH is generally too slow to be able to use the silicate as a binder in coating formulations. However, in either acidic or basic medium, the rate of hydrolysis is appreciably increased. In acid conditions, achieved by adding small amounts of an acid to the water used in the hydrolysis, the equilibrium conditions are reached in hours. These equilibrium conditions, which are,

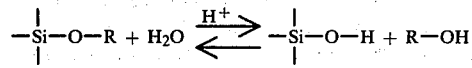

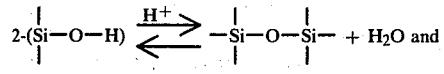

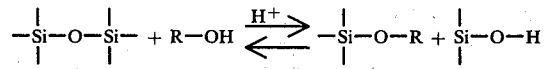

all occur simultaneously. Also under acid conditions, the tendency for linear chain extension and cyclization is much stronger than for cross-linking. All of these account for the liquid nature of the hydrolyzed prepolymer when in a closed system where no alcohol can escape. In the atmosphere, the alcohol can evaporate, thereby driving the equilibrium toward the condensed silicate form.

Dilute aqueous hydrochloric acid can be used to catalyze the hydrolysis of the precursor. Other acids which can be used as catalysts include mineral acids such as sulfuric acid, orthophosphoric acid, and nitric acid, and organic acids such as trichloroacetic acid, formic acid and oxalic acid. The amounts to be used vary for each acid, but the optimum quantity can readily be determined by a chemist of ordinary skill in the art. The action of organic acids generally is slower than that of inorganic acids.

Hydrolysis of the precursor can also be catalyzed by a hydroxyl source which itself is nonreactive with the precursor, but which reacts with moisture to produce hydroxyl ions, such as described in U.S. Pat. No. 3,653,930, issued to Law et al, and incorporated herein by reference. This patent describes catalyzing hydrolysis of silicates with a hydroxyl source nonreactive with the silicate and reactive with moisture to produce hydroxyl ions. Exemplary of hydroxyl sources are organic amines such as mono-, di-, and triethanolamine, diamylamine, cyclohexylamine, piperidine, and the like, and inorganic hydroxyl sources such as potassium, sodium, and lithium hydroxide.

A solvent may also be used when the precursor is hydrolyzed. Thus, the precursor is dissolved in a solvent such as ethanol before hydrolysis. Exemplary of the solvents which can be used are those listed in Table I of U.S. Pat. No. 3,653,930. Preferably, the solvent is the same alcohol as the alcohol from hydrolysis reaction. For example, when the precursor comprises tributyltin ethoxysiloxane, ethyl alcohol results from hydrolysis and the preferred solvent is ethyl alcohol. In practice of this invention, such solvent is distilled from the solution and it is preferable to recover a single distillate for reuse in the process or for other uses without further separations.

It has previously been considered appropriate to supply a coating composition including a precursor or prepolymer in a package with a hydrolysis catalyst. For example, a precursor can be packaged with a source of hydroxyl ions so that upon addition of water, hydrolysis and polycondensation can occur. It has not been considered appropriate to hydrolyze the precursor with hydroxyl ion catalysis an appreciable time before application as a coating because of the possibility of premature gellation and short shelf life. When the precursor is hydrolyzed with acid catalysis, the precursor, a water miscible solvent, water, and acid can be packaged together for reducing the curing time of the applied coating. In some embodiments, the acid catalyzed coating composition can be provided in a single container. In the acid catalyzed product, it had previously been considered necessary to prevent evaporation of the alcohol product of hydrolysis to prevent premature polycondensation and less than complete hydrolysis of the precursor is preferred.

It has been found that gellation of the organotin siloxane can be inhibited by substantially completely hydrolyzing the organotin R-oxysiloxane and replacing the alcohol from the hydrolysis reaction with a water immiscible solvent such as xylene. It appears that some polymerization occurs in the xylene, forming a solution of polymeric material, since the solution becomes viscous. The polymeric material in the solution can be considered for two different ranges of tin to silicon ratio. As pointed out above, when the ratio of tin atoms to silicon atoms in a polymer is less than about 2:5, appreciable cross-linking can occur for forming solid films suitable as binders in coating compositions. When the ratio of tin atoms to silicon atoms in a polymer is more than about 2:5, steric hindrances inhibit cross-linking and an essentially linear polymer is obtained.

When the tin to silicon ratio is more than about 2:5, it appears that linear polymerization of prepolymer occurs as alcohol is distilled from the solution, resulting in a solution of polymeric material in water immiscible solvent where the polymeric material may be similar to the polymer obtained by evaporating the alcohol and forming a film, for example. This appears so since the solution is somewhat similar to a solution made by redissolving in water immiscible solvent a film made by evaporating alcohol from a prepolymer solution. It is believed, however, that the polymeric material in a solution made by mixing water immiscible solvent with the water miscible solvent and then distilling off the water miscible solvent has greater polymerization that a redissolved polymer. The elevated temperature used for distillation is believed to promote added polymerization of the polymeric material. It is desirable to directly transfer from a water miscible solvent to a water immiscible solvent since appreciably faster and easier than going through a solid state.

When the tin to silicon ratio is less than about 2:5, the prepolymer can cross-link when alcohol evaporates from a solution. Surprisingly, however, when a water immiscible solvent such as xylene is added and the alcohol distilled from the solution, cross-linking is inhibited and a solution containing organotin substituted siloxane polymeric material results. Some polymerization of the prepolymer is believed to occur since viscosity of a xylene solution is noticeably higher than viscosity of an original ethyl alcohol solution. The polymeric material in the xylene solution is not completely cross-linked, otherwise it would not be retained in solution. Neither the exact state of the polymeric material nor the reasons for this effect are known. Such a solution cannot be made by redissolving a solidified polymer since the cross-linked polymer is not soluble in xylene or similar water immiscible solvents.

Formation of a substantially completely hydrolyzed solution of polymeric material in a water immiscible solvent can be quite advantageous. By replacing water miscible solvent with water immiscible solvent, the polymeric material can be made compatible with a variety of coating ingredients with which it is not compatible before hydrolysis and/or in the presence of ethanol or other water miscible solvents. For example, hydrolyzed polymeric material in xylene is compatible with chlorinated rubber coating compositions. Further, by this technique, entrapment of residual ethanol or other product of the hydrolysis reaction in the coating film is prevented. Polymers with high tin content are particularly susceptible to this condition.

Preparation of a solution containing hydrolyzed polymeric material can be understood by reference to an exemplary embodiment. Thus, for example, tributyltin ethoxysiloxane is dissolved in a water miscible solvent such as ethanol. This precursor is hydrolyzed by adding a hydrolysis catalyst and water. Complete hydrolysis requires one mole of water per two moles of alkyl and-/or alkoxyalkyl groups on the precursor. When the hydrolysis is acid catalyzed, a dilute aqueous solution of acid can be slowly added to the solution of siloxane in ethyl alcohol with good stirring. The addition can be at ambient or elevated temperature up to the temperature where decomposition of materials commences. When the reaction is catalyzed by hydroxyl ions, a source for generating hydroxyl ions such as an amine can be added to the ethyl alcohol solution of siloxane. Water is then slowly added to the well stirred mixture at ambient or elevated temperature. Additional ethanol is a product of the hydrolysis.

A nonreactive or water immiscible solvent such as xylene is added before, during, or after the hydrolysis. It can be desirable to add the water immiscible solvent after hydrolysis in the case of acid catalysis and before hydrolysis in the case of hydroxyl catalysis.

When the hydrolysis is complete and the water immiscible solvent has been added, temperature is raised sufficiently to remove ethanol by distillation. The product is a solution of hydrolyzed polymeric material with a concentration dependent on the amount of water immiscible solvent added.

Although the example employs a specific siloxane and specific solvents, it will be apparent that a variety of materials as outlined above can be employed. Preferably, the water miscible solvent is the same alcohol as results from the hydrolysis reaction.

The water immiscible solvent is preferably xylene which is compatible with the ethyl alcohol of the preferred embodiment, as well as being a good solvent in coating compositions. Ethyl alcohol can be readily distilled from such a mixture. Other suitable solvents can be selected from the water immiscible solvents set forth in Table I of U.S. Pat. No. 3,653,930, incorporated by reference hereinabove. Additional exemplary water immiscible solvents include halogenated solvents such as methylene chloride, carbon tetrachloride, trichloroethylene and trichlorotrifluoroethane; various alkanes such as pentane, hexane, octane or cyclohexane, or low melting waxes, some acetates such as sec-butylacetate and tert-butylacetate; benzene; naphtha; toluene; methyl isobutyl ketone; mineral spirits; gasoline; turpentine, lograine, kerosene, and the like. The water immiscible solvent preferably has a higher boiling point than the water miscible solvent or R-alcohol product of hydrolysis so that they can be removed by distillation. Other techniques for removing the water miscible solvent, such as a molecular sieve, can also be employed in some embodiments.

Such a solution containing polymeric material can be mixed with a variety of ingredients for forming compositions for forming marine antifouling coatings. A broad variety of solvents, thixotropic agents, fillers, pigments, binders, and the like for marine antifouling coating compositions will be apparent. Oil based and water based paints, organic polymer coating compositions such as acrylic, polyethylene, polypropylene, polystyrene, polyurethane, polyvinylchloride, chlorinated rubber, alkyd resins, and similar coating materials can be included. Diluents, fillers, and pigments can be included in a coating composition such as talc, limestone, diatomaceous earth, clay, iron oxides, zinc oxides, lead oxide, titanium, dioxide, zinc dust, silica, wollastonite, barites, barium metaborate, chrome yellow, chrome green, copper, copper oxide, and the like. Organic dyes may also be used to color the product.

These and other features of the present invention will be further understood by reference to the following Examples.

EXAMPLE I

A precursor is formed by reacting 533.2 grams of Ethyl Silicate 40 with 623.7 grams of tributyl tin acetate. Ethyl acetate from the reaction is removed by distillation yielding 1000 grams of tributyltin ethoxysiloxane or tributyltin ethyl silicate. This precursor is mixed with 500 grams of ethyl alcohol, 20 grams of 2-ethylaminoethanol and 200 grams of xylene. This solution is heated to about 50° C. and stirred vigorously while 61 grams of water is added dropwise to the solution over a period of about 15 minutes. The temperature of the solution is then increased to effect distillation of the ethyl alcohol. Distillation is complete when 942.5 grams of distillate is collected. The product, comprising a tributyltin substituted siloxane polymeric material in xylene, is a viscous liquid.

EXAMPLE II

A marine antifouling coating composition is formulated from a solution containing polymeric material prepared in accordance with Example I and contains the following ingredients: 98.0 grams of tributyltin silicate (from Example I), 77.0 grams of Alloprene X-10 (a chlorinated rubber binder), 9.2 grams of coal tar, 36.3 grams of ww rosin, 5.6 grams of pine oil, 15.8 grams of Shell solvent 1693 (a petroleum distillate), 3.0 grams of Chevron solvent 265 (naphtha), 39.0 grams of xylene, 1.6 grams of methanol, 56.0 grams of zinc oxide, 42.0 grams of red iron oxide, 35.0 grams of talc, and 5.4 grams of Bentone 34 (dimethyldioctadecyl ammonium bentonite). When this composition is coated on a substrate and the solvents evaporate, an adherent, tough, somewhat resilient marine antifouling coating results.

EXAMPLE III

A precursor is formed by reacting 745.2 grams of Ethyl Silicate 40 with 453.3 grams of tributyltin acetate. Ethyl acetate from the reaction is removed by distillation. A solution is formed comprising 200 grams of the resultant tributyltin ethyl silicate in 100 grams of ethanol. The solution is heated to 40° C. and stirred vigorously during slow dropwise addition of 17.8 grams of a 2% solution of sulfuric acid in water combined with an equal volume of ethanol. When the addition of this mixture is complete, 50 milliliters of xylene is added to the solution which is then heated to distill the ethyl alcohol. When about 150 milliliters of distillate has been collected, an additional 200 milliliters of xylene is added, distillation is considered complete when a total of 400 milliliters of distillate has been collected. The product is a clear liquid which becomes somewhat cloudy upon cooling. Full cross-linking and precipitation of polymer was not observed. This solution containing polymeric material is useful in a variety of marine antifouling coating compositions.

What is claimed is:

1. A method for preparing a solution containing hydrolyzed organotin siloxane polymeric material comprising the steps of:
   combining an organotin R-oxy siloxane in which the ratio of tin atoms to silicon atoms is in the range of 1:50 to 1:1, where R represents a group consisting of alkyl and alkoxyalkyl radicals containing less than six carbon atoms, a water miscible solvent, water, a hydrolysis catalyst, and a water immiscible solvent; and
   after hydrolysis of the organotin R-oxy siloxane, removing by distillation the water miscible solvent and R-alcohol from the hydrolysis reaction.

2. A method as recited in claim 1 wherein sufficient water is combined for substantially completely hydrolyzing the organotin R-oxy siloxane.

3. A method as recited in claim 1 wherein the water miscible solvent comprises R-alcohol.

4. A method as recited in claim 3 wherein R is the ethyl radical.

5. A method as recited in claim 4 wherein the water immiscible solvent comprises xylene.

6. A method as recited in claim 1 wherein the water immiscible solvent comprises xylene.

7. A method as recited in claim 6 wherein sufficient water is combined for substantially completely hydrolyzing the organotin R-oxy siloxane.

8. A method as recited in claim 1 wherein the water immiscible solvent is added after hydrolysis and before distillation.

9. A method as recited in claim 1 wherein the ratio of tin atoms to silicon atoms in the organotin R-oxy siloxane is less than about 2:5.

10. A method for preparing a solution containing hydrolyzed organotin substituted siloxane polymeric material comprising the steps of:
    combining a precursor having the formula:

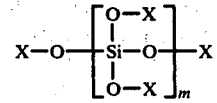

wherein m is from about 1 to about 10, each X is independently selected from the group consisting of R and Y, R is selected from the group consisting of alkyl and alkoxyalkyl radicals containing less than about six carbon atoms, and each Y is independently a trisubstituted tin radical having the formula:

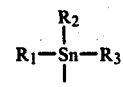

where $R_1$, $R_2$, and $R_3$ are independently selected from the group consisting of alkyl, cycloalkyl, and aryl radicals, and contain in combination up to about eighteen carbon atoms and wherein the ratio of tin atoms to silicon atoms in the precursor is in the range of from about 1:50 to 1:1; a water miscible solvent; water; a source of ions selected from the group consisting of hydrogen ion and hydroxyl ion; and a water immiscible solvent having a boiling point higher than the boiling point of the water miscible solvent; and after hydrolysis of the precursor removing by distillation the water miscible solvent and R-alcohol from the hydrolysis reaction.

11. A method as recited in claim 10 wherein m is an average of about five.

12. A method as recited in claim 10 wherein the water immiscible solvent is added after hydrolysis and before distillation.

13. A method as recited in claim 10 wherein the ratio of tin atoms to silicon atoms in the precursor is less than about 2:5.

14. A method as recited in claim 10 wherein R is ethyl.

15. A method as recited in claim 14 wherein the water miscible solvent comprises ethyl alcohol.

16. A method as recited in claim 15 wherein the water immiscible solvent comprises xylene.

17. A method as recited in claim 10 wherein the water immiscible solvent comprises xylene.

18. A method as recited in claim 10 wherein sufficient water is included for substantially completely hydrolyzing the precursor.

19. A method for preparing a solution containing hydrolyzed organotin siloxane polymeric material comprising the steps of:

combining trisubstituted-organotin ethoxysiloxane in which the ratio of tin atoms to silicon atoms in the organotin ethoxysiloxane is in the range of from about 1:50 to 1:1, with a water miscible solvent, a source of hydroxyl ion, and a water immiscible solvent;

gradually adding water for hydrolyzing the organotin ethoxysiloxane; and removing by distillation the water miscible solvent and ethyl alcohol from such hydrolysis.

20. A method as recited in claim 19 wherein sufficient water is added for substantially completely hydrolyzing the organotin ethoxysiloxane.

21. A method as recited in claim 19 wherein the water miscible solvent comprises ethyl alcohol.

22. A method as recited in claim 21 wherein the water immiscible solvent comprises xylene.

23. A method as recited in claim 19 wherein the ratio of tin atoms to silicon atoms in the organotin ethoxysiloxane is less than about 2:5.

24. A method as recited in claim 19 wherein the organotin radical comprises tributyltin.

25. A method for preparing a solution containing hydrolyzed organotin siloxane polymeric material comprising the steps of:

combining a trisubstituted-organotin ethoxysiloxane in which the ratio of tin atoms to silicon atoms in the organotin ethoxysiloxane is in the range of from about 1:50 to 1:1, and a water miscible solvent;

gradually adding water and a source of hydrogen ion for hydrolyzing the organotin ethoxysiloxane;

adding a water immiscible solvent; and removing by distillation the water miscible solvent and ethyl alcohol from such hydrolysis.

26. A method as recited in claim 25 wherein sufficient water is added for substantially completely hydrolyzing the organotin ethoxysiloxane.

27. A method as recited in claim 25 wherein the water miscible solvent comprises xylene.

28. A method as recited in claim 25 wherein the water immiscible solvent comprises xylene.

29. A method as recited in claim 25 wherein the ratio of tin atoms to silicon atoms in the organotin ethoxysiloxane is less than about 2:5.

30. A method as recited in claim 25 wherein the organotin radical comprises tributyltin.

31. A method for preparing a solution containing hydrolyzed organotin siloxane polymeric material comprising the steps of:

reacting sufficient ethoxysiloxane and a trisubstituted tin compound selected from the group consisting of tributyltin acetate and bis-tributyltin oxide for forming a precursor in which the ratio of tin atoms to silicon atoms is in the range of from about 1:50 to 1:1;

dissolving the precursor in ethyl alcohol;

adding water and a source of hydrolysis catalyst selected from the group consisting of hydrogen ion and hydroxyl ion to the precursor solution for forming a hydrolyzed prepolymer in solution in ethyl alcohol;

adding a water immiscible solvent to the solution of prepolymer in ethyl alcohol; and removing the ethyl alcohol by distillation.

32. A method as recited in claim 31 wherein the water immiscible solvent is compatible with a chlorinated rubber binder for a marine antifouling coating.

33. A method as recited in claim 31 wherein the water immiscible solvent comprises xylene.

34. A method as recited in claim 34 wherein the ratio of tin atoms to silicon atoms in the organotin ethoxysiloxane is less than about 2:5.

35. A method as recited in claim 31 wherein the water immiscible solvent is added before the water.

36. A solution comprising a water immiscible solvent containing a polymeric material consisting essentially of substantially completely hydrolyzed organotin substituted siloxane dissolved in the solvent, where the ratio of tin atoms to silicon atoms in the polymeric material is in the range of from about 1:50 to 2:5.

37. A solution as recited in claim 36 wherein the organotin moiety comprises tributyltin radical.

38. A solution as recited in claim 36 wherein the water immiscible solvent comprises xylene.

39. A solution comprising xylene containing a substantially completely hydrolyzed polymeric tributyltin substituted siloxane dissolved in the xylene where the ratio of tin atoms to silicon atoms in the siloxane is in the range of from about 1:50 to 2:5.

* * * * *

UNITED STATES PATENT AND TRADEMARK OFFICE
CERTIFICATE OF CORRECTION

PATENT NO. : 4,311,629
DATED : January 19, 1982
INVENTOR(S) : A. Peter Gysegem

It is certified that error appears in the above—identified patent and that said Letters Patent is hereby corrected as shown below:

```
Column 4, line 31, "or" should be -- on --.
Column 8, line 60, "lograine" should be -- ligroin --.
Column 12, line 41, "34" (second occurrence) should be -- 31 --.
```

Signed and Sealed this

Eleventh Day of May 1982

[SEAL]

Attest:

GERALD J. MOSSINGHOFF

*Attesting Officer*   *Commissioner of Patents and Trademarks*